May 19, 1970     J. C. STILES     3,512,419

TWO-AXIS FLEXURE HINGE

Filed Dec. 13, 1968     2 Sheets-Sheet 2

INVENTOR.
JOHN C. STILES

BY
ATTORNEY 3,512,419
TWO-AXIS FLEXURE HINGE
John C. Stiles, Thousand Oaks, Calif., assignor to Singer-General Precision, Inc., Little Falls, N.J., a corporation of Delaware
Filed Dec. 13, 1968, Ser. No. 783,506
Int. Cl. G01c *19/22;* F16d *3/52*
U.S. Cl. 74—5                                                9 Claims

ABSTRACT OF THE DISCLOSURE

A gyroscopic flexure hinge is provided comprising four V-shaped torsion arms of equal length radiating from an annular hub supporting member. The torsion arms are equiangularly spaced around the hub and have their apexes aligned to form two quadrature opposed pairs, each pair defining a torsional rotation axis. This arrangement gives the assembly the appearance of four "pup" tents pitched symmetrically about a quadrangle. A center plug member is secured to the annular hub to stiffen the center section and provide compensation for the positive mechanical spring rate of the torsion members. One pair of diametrically opposed radial arms is fixed to the drive shaft of the gyro and the remaining pair of arms is secured to the gyro's rotor or inertial flywheel.

BRIEF SUMMARY OF THE INVENTION

The present invention relates generally to the art of gyroscopes, and more specifically, to a frictionless, universal joint suspension element for use in free-rotor displacement type gyros. Similar gyroscopic suspension elements are fully disclosed, for example, in applicant's copending applications, Ser. No. 602,230 and now Pat. No. 3,427,828, filed Dec. 16, 1966 entitled "Gyro With Flexure Hinge," and Ser. No. 619,649 and now Pat. No. 3,452,608, filed Mar. 1, 1967 entitled "Tubular Hinge Suspension for a Gyro Rotor," each of which is commonly assigned to the assignee of the present application.

In gyroscopes of the class described, the suspension element or flexure hinge as it is sometimes synonymously referred to, functions as a frictionless universal joint member interconnecting the inertial flywheel or rotor to one end of a rotating drive shaft. Thus, the hinge element not only imparts rotation from the spin shaft to the rotor, but furthermore, serves as a gimbal permitting tilting of the flywheel relative to the shaft's spin axis. The hinge unit therefore must be designed to have a high degree of angular compliance, yet at the same time provide an extremely rigid support for the rotor against radial and axial motions relative to the spin shaft.

To the accomplishment of these and other objectives, the present invention contemplates a one-piece gyroscopic suspension hinge comprising two quadrature related pairs of opposed arms, one pair being fixedly attached to the rotor or flywheel and the other pair being fixedly attached to the drive shaft. Each arm has a substantially V-shaped cross section and rotates in torsion about a well defined axis passing through its apex. With respect to its fabrication, the entire hinge is constructed of sheet metal stock cut and bent to the desired shape. Hence no critical machining is required, nor is there any forming or distortion of the material with the result that the thickness dimension—which is by far the most critical—may be accurately maintained. Consequently, an extremely simplified and highly accurate gyroscopic suspension hinge may be produced at relatively low cost.

Additional objects and advantages as well as a thorough understanding of the present invention will be made more apparent after a study of the following detailed description thereof in connection with the accompanying drawings.

DETAILED DESCRIPTION OF THE INVENTION

Figure 1:
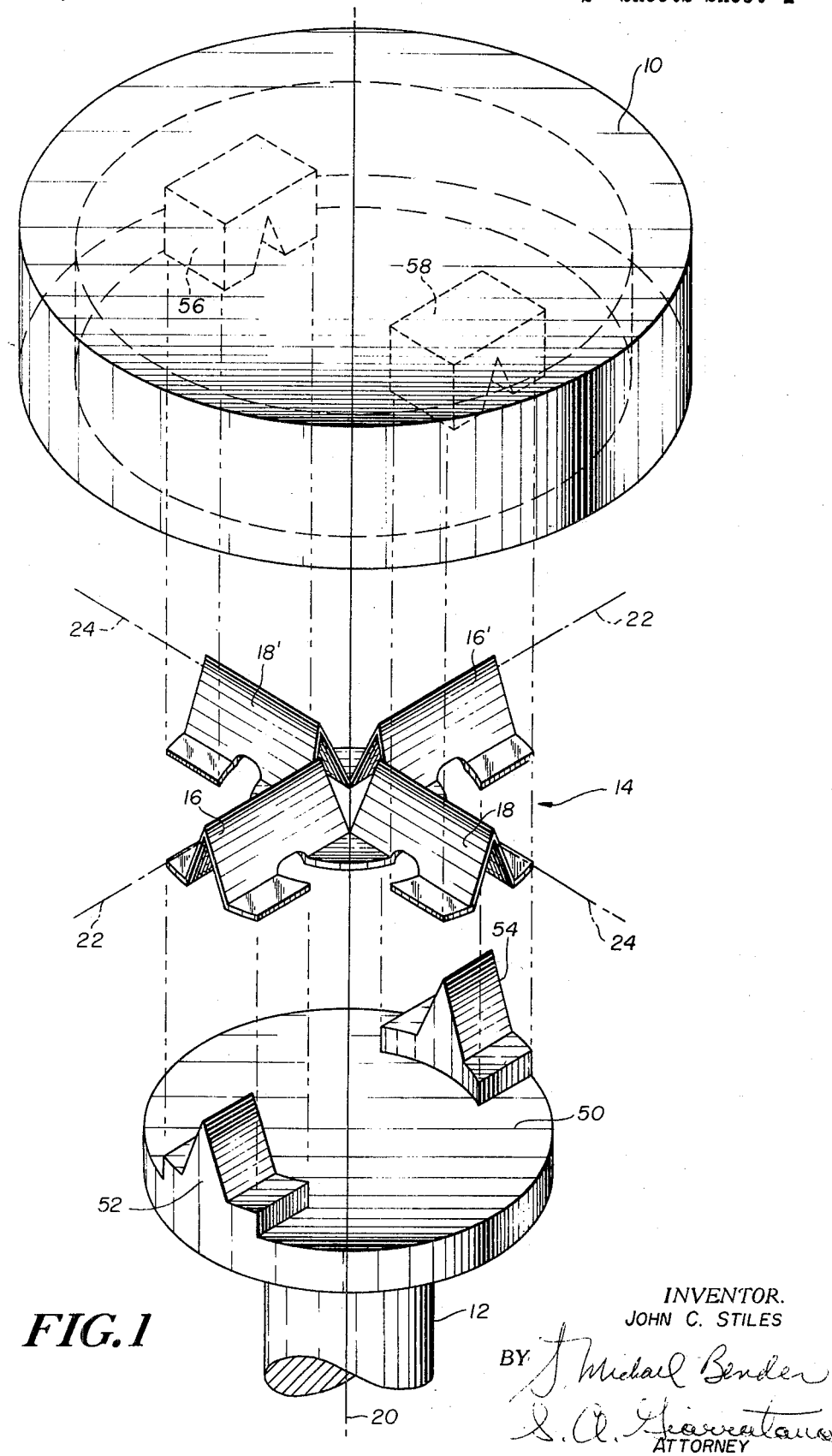
FIG. 1 is an assembly in perspective showing the gyroscopic suspension in accordance with the present invention.

Referring now to FIG. 1, there is schematically shown an assembly including a gyroscopic rotor or inertial flywheel 10 and a drive shaft 12. The flywheel is adapted to be rotated about a spin axis 20 passing coaxially through the shaft by a frictionless two-axis torsion hinge 14 which interconnects the flywheel to the drive shaft and forms a universal joint therebetween. It will be understood that the drive shaft is supported in a suitable bearing structure and the parts shown enclosed within a gyro casing. However, these elements, which are conventional, have been omitted for the sake of clarity.

In accordance with the present invention, torsion hinge 14 comprises a first pair of diametrically opposed longitudinally aligned V-shaped torsion arm members or channels 16 and 16' and a second pair of diametrically opposed longitudinally aligned V-shaped torsion arm members or channels 18 and 18' in quadrature with the first pair. Arm members 16, 16', 18, and 18' are identical to one another, are equally radially offset from the gyro's spin or reference axis 20 and have their apexes lying along a line normal to this axis and in common intersection relation therewith, respectively. Thus, V-shaped channels 16 and 16' have their apexes colinearly aligned along a first axis 22 whereas V-shaped channels 18 and 18' have their apexes colinearly aligned along a second axis 24 in quadrature with axis 22.

It can be shown mathematically that the center of rotation in torsion for a V-shaped channel member must be substantially along the apex of the V. Hence, axes 20 and 22 define two mutually perpendicular torsion axes for hinge assembly 10.

Figure 2:
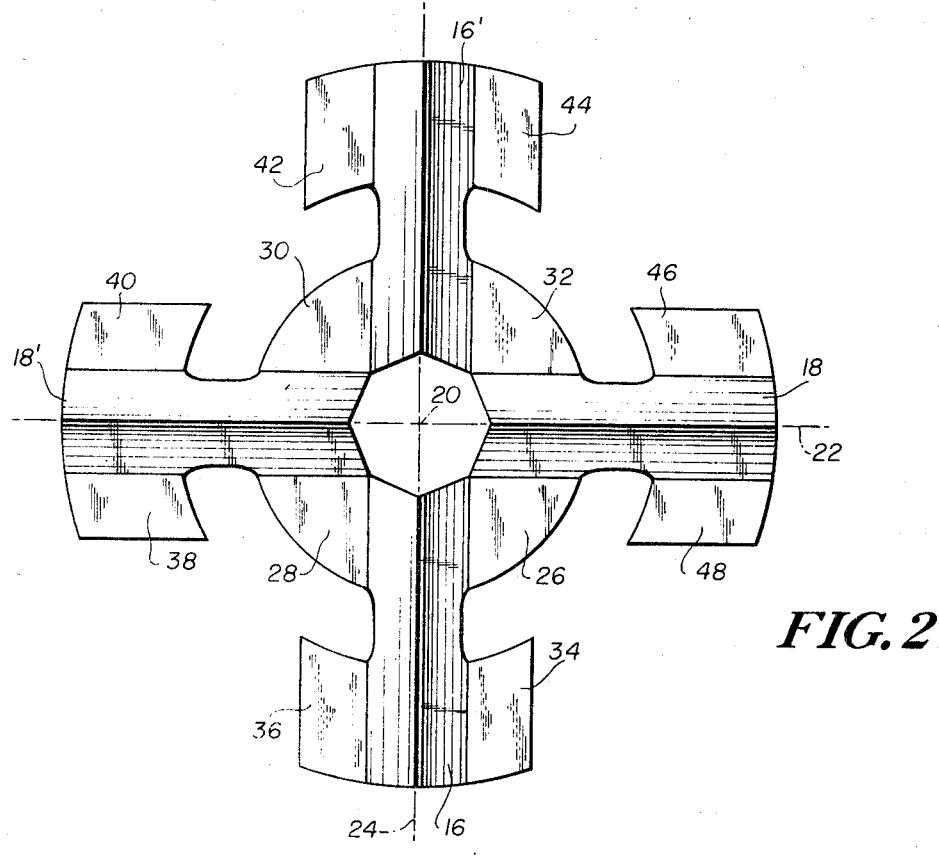
FIGS. 2 and 3 are enlarged views of a portion of FIG. 1.
Figure 3:
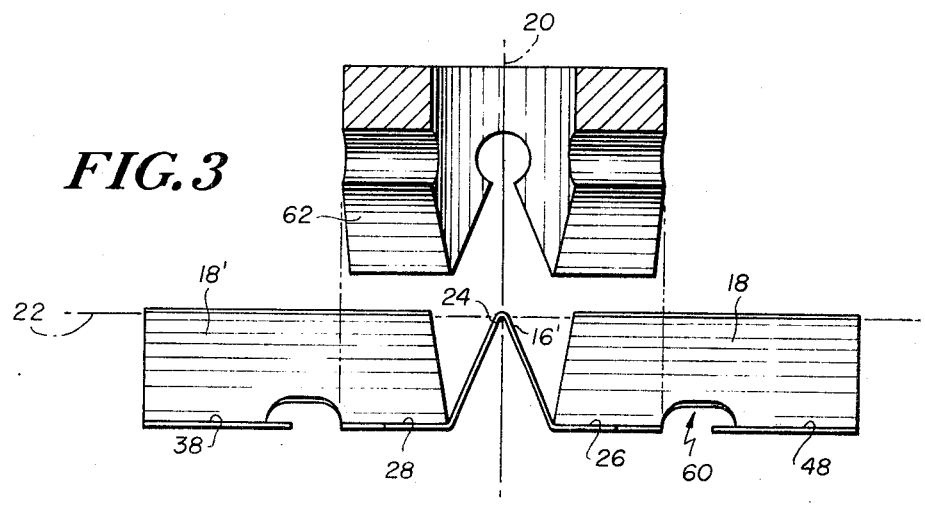

Referring now to FIGS. 2 and 3, the four V-shaped torsion arms are rigidly supported at their innermost ends respectively by a series of our integral horizontally disposed web sections 26, 28, 30, and 32 each one of which is shaped substantially in the form of a quadrant radially offset from spin axis 20 as illustrated. With this arrangement, the V-shaped channels appear to resemble four "pup" tents pitched symmetrically around a quadrangle with the corners of any two adjacent tents in abutting relation. In addition, the four quadrant shaped webs appear to form a connecting ring or annular hub from which the "pup" tent torsion arms radially extend.

The V-shaped torsion arms have disposed respectively at their outer ends a pair of laterally extending horizontal supporting tabs for attachment to either drive shaft 12 or rotor 10. With reference again to the embodiment illustrated in FIG. 1, drive shaft 10 includes a horizontal disc-shaped axial end member 50 having fixedly disposed thereon a pair of diametrically opposed upstanding support blocks 52 and 54. Each of these blocks has upper surfaces shaped to conform congruently to the undersides of the outer end portions of torsion arms 16 and 16′ and support tabs 34, 36 and 42, 44, respectively, which latter are fastened to the blocks in a conventional manner as by cementing, welding, clamping and the like. Similarly, the underside of rotor 10 has fixedly fastened thereto a pair of diametrically opposed downwardly extending support blocks 56 and 58 each of which includes undersides congruently shaped to conform to the upper surfaces of the outer end portions of torsion arms 18 and 18′ and supporting tabs 38, 40 and 46, 48, respectively. The latter then are also suitably fixedly fastened to blocks 56 and 58.

Figure 4:
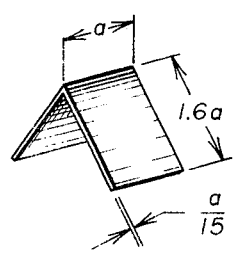
FIG. 4 is an enlarged view of a portion of FIGS. 2 and 3.

The central portion of each V-shaped torsion arm is cut away slightly as indicated for example by arrow 60 in FIG. 3. This is done to define an effective torsional hinge section as depicted in FIG. 4 having a width equal to A, a slant height equal to approximately 1.6A and a thickness equal to approximately $A/15$. The ratio of axial to radial compliance, which controls the isoelasticity of the hinge assembly, is adjustable by varying the dihedral angle of the various V-shaped arms. For example, a dihedral angle within the range of 50°–60° will produce a substantially isoelastic hinge assembly which, of course, is preferred to minimize gyroscopic drift.

Since hinge assembly 14 has two degrees of freedom, i.e., rotation in torsion about mutually perpendicular axes 22 and 24, it provides a universal joint connection between the drive shaft 12 and the gyro rotor 10. Thus, not only will the torsional hinge impart rotation to the rotor from the drive shaft, but furthermore, will permit the rotor to tilt about any transverse axis perpendicular to the spin axis 20. It will be noted further in this connection that the limits of tilt or angular displacement of rotor 10 may be varied by simply adjusting the height of supporting blocks 52, 54, and 56, 58.

In fabricating the torsion hinge assembly of the present invention, it is merely necessary to bend a sheet of metal stock and then cut to the desired shape. No critical machining, distortion, or forming of the metal is required since the critical dimension, viz., the thickness of the sheet stock, may be easily maintained. Thus, it is obvious that the present invention relates to a gyroscopic flexure hinge or suspension element that is simpler in design, more compact in size, and relatively cheaper in cost than those heretofore known in the art.

Although a preferred embodiment has been disclosed hereinabove by way of illustration, it is expected that various additions, modifications, and variations thereto may be attempted by those skilled in the art without departing from the principles of the invention. For example, it is known that in torsion hinges of the type described, the oscillatory motion imparted to the hinge assembly when the gyro rotor is rotating off null produces a positive spring rate causing the rotor to drift at right angles to the direction of displacement. This positive spring rate may be exactly compensated for by cementing or otherwise fastening a plug member to the center section of the hinge assembly as indicated, for example, in FIG. 4. Plug 62 which is shown in cross-section in FIG. 4, has a shape substantially conforming to that of the hinge's center section. Moreover, the size of plug member 62 is calculated so that its moment of inertia about each torsion axis and the spin axis, respectively, is sufficient to produce an inertial reaction to the oscillatory or wobbling motion imparted to it. This will, in turn, introduce a negative effective spring rate to the assembly sufficient to exactly cancel the positive mechanical spring rate of the torsion hinge elements. It will be noted in addition that when plug member 62 is fastened in place it will serve the dual function of a stiffener adding additional strength and rigidity to the torsional hinge assembly.

It is thus seen that the present invention relates to a simplified flexure hinge assembly for use in free-rotor displacement type gyroscopes which hinge assembly has the desired characteristics of high angular compliance and extreme rigidity against all linear displacements.

What is claimed is:

1. A hinge suspension for use in a gyroscope including a rotor and a drive shaft, comprising
   a supporting hub intermediately disposed between the axial end of said shaft and said rotor,
   a first pair of diametrically opposed substantially V-shaped torision bars fixedly connected to said hub at one end thereof respectively and radially extending outwardly therefrom,
   a second pair of diametrically opposed substantially V-shaped torsion bars fixedly connected to said hub at one end thereof respectively and radially extending outwardly therefrom, said second pair of torsion bars being in quadrature with respect to said first pair of torsion bars,
   a pair of supporting members extending upwardly from the axial end of said drive shaft and being connected to the radially extending outward ends of said first pair of torsion bars, and
   a second pair of supporting members extending downwardly from said rotor and being connected to the radially extending outward ends of said second pair of torsion bars.

2. The apparatus of claim 1 wherein the apexes of each respective pair of V-shaped torsion bars are colinearly aligned to form an axis of torsional rotation normal to and intersecting the spin axis of said drive shaft.

3. The apparatus of claim 1 wherein said supporting hub comprises a plug member having a moment of inertia sufficient to cancel the positive mechanical spring rate of said torsion bars.

4. The apparatus of claim 1 wherein said hub member and said first and second pairs of torison bars comprise an integral one-piece construction bent and then cut to shape from a sheet of spring metal stock.

5. The apparatus of claim 1 wherein the central portion of each V-shaped torsion bar not immediately connected to either said hub member or to either of said supporting members defines an effective torsional hinge section having a dihedral angle sufficient to minimize the ratio of radial to axial compliance of said section.

6. A torsional flexure hinge for use in a gyroscope including a rotor and a drive shaft having a spin axis comprising,
   four elongated V-shaped torsion members radially spaced about said spin axis intermediate said rotor and one end of said drive shaft to form two quadrature related pairs of longitudinally aligned diametrically torsion members,
   four web sections disposed between adjacent ones of said torsion elements respectively for rigidly supporting the radially inner end portions of said torsion elements in fixed relationship as hereinaforesaid,
   means for fixedly supporting the radially outer end portions of a first pair of said opposed torsion elements attached to said one end of said drive shaft, and means for fixedly supporting the radially outer end portions of the other pair of said opposed torsion members attached to said rotor whereby said four torsion members form a universal joint connection between said rotor and said drive shaft.

7. The apparatus of claim 6 wherein the torsion members in each of said pairs have their apexes colinearly aligned to form a pair of torsion axes perpendicular to each other and to said spin axis and commonly intersecting therewith.

8. The apparatus of claim 6 wherein said supporting web sections are radially spaced from said spin axis to maintain the radially inner ends of adjacent torsion members in abutting relation.

9. The apparatus of claim 6 further including means for cancelling the positive mechanical spring rate of said V-shaped torsion members.

References Cited

UNITED STATES PATENTS

| | | | |
|---|---|---|---|
| 1,980,823 | 11/1934 | Post | 64—11 |
| 2,973,633 | 3/1961 | Hall | 64—11 |
| 2,797,580 | 7/1957 | Taylor | 74—5 |
| 2,966,049 | 12/1960 | Ormond | 64—15 |
| 3,119,607 | 1/1964 | Wilcox et al. | 64—15 XR |
| 3,339,421 | 9/1967 | Warnock | 74—5 |

MANUEL A. ANTONAKAS, Primary Examiner

U.S. Cl. X.R.

64—15